US011089028B1

(12) United States Patent
Alpaugh et al.

(10) Patent No.: US 11,089,028 B1
(45) Date of Patent: Aug. 10, 2021

(54) TOKENIZATION FEDERATION SERVICE

(71) Applicant: Amazon Technologies, Inc., Seattle, WA (US)

(72) Inventors: Michael Alpaugh, Mullica Hill, NJ (US); Hart Rossman, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 565 days.

(21) Appl. No.: 15/387,306

(22) Filed: Dec. 21, 2016

(51) Int. Cl.
*H04L 29/06* (2006.01)
*G06F 21/62* (2013.01)

(52) U.S. Cl.
CPC ........ *H04L 63/104* (2013.01); *G06F 21/6254* (2013.01); *H04L 63/0815* (2013.01); *H04L 63/20* (2013.01)

(58) Field of Classification Search
CPC ... H04L 63/104; H04L 63/0815; H04L 63/20; G06F 21/6254
USPC .......................................................... 726/4
See application file for complete search history.

(56) References Cited

U.S. PATENT DOCUMENTS

| 4,853,843 | A * | 8/1989 | Ecklund | ................ | G06F 16/278 |
| 7,650,383 | B2 * | 1/2010 | Logue | ................ | H04L 63/0442 709/206 |
| 8,204,920 | B2 * | 6/2012 | Smith | .................... | G06F 16/84 707/827 |

(Continued)

FOREIGN PATENT DOCUMENTS

| CN | 102457376 A | * | 5/2012 |
| CN | 102761549 B | * | 4/2015 |

(Continued)

OTHER PUBLICATIONS

Lee, Shih-Hsiung, Chih-Nan Hu, and Chu-Sing Yang. "Token-oriented based for Internet of Things and Clouding computing services." In Proceedings of the International Conference on Internet of things and Cloud Computing, p. 52. ACM, 2016. (Year: 2016).*

(Continued)

*Primary Examiner* — Luu T Pham
*Assistant Examiner* — Walter J Malinowski
(74) *Attorney, Agent, or Firm* — Robert C. Kowert; Kowert, Hood, Munyon, Rankin & Goetzel, P.C.

(57) ABSTRACT

Devices and processes perform federation of tokenization services. A tokenization federation service establishes trust relationships between tokenization services that substitute tokens for sensitive data and acts as a mechanism for token portability among distinct tokenization domains. The tokenization federation service receives a request from a tokenization service to establish a tokenization federation group, and receives membership policy information, token rules and token access policy information from the tokenization service for federation that are all associated with the federation and stored. The tokenization federation service receives another request from another tokenization service to join the federation, and if the membership policy allows, is made a member of the federation group. Access by the members to tokens is regulated in accordance with the access policy. The tokenization federation service may register tokens, field requests for tokens and sensitive data from members, and may provide an integration point to other services.

16 Claims, 9 Drawing Sheets

(56) References Cited

U.S. PATENT DOCUMENTS

| | | | |
|---|---|---|---|
| 8,275,985 B1* | 9/2012 | Narayanan | H04L 67/02 713/160 |
| 8,544,074 B2* | 9/2013 | Guo | G06F 21/41 726/9 |
| 8,752,152 B2* | 6/2014 | Kol | H04L 9/3271 726/9 |
| 8,935,802 B1* | 1/2015 | Mattsson | G06Q 20/382 726/26 |
| 8,990,557 B2* | 3/2015 | Kassaei | H04L 63/20 713/159 |
| 9,021,135 B2 | 4/2015 | Ang et al. | |
| 9,420,007 B1* | 8/2016 | Roth | H04L 63/205 |
| 9,734,321 B2* | 8/2017 | Ahmed | H04L 63/0815 |
| 10,142,333 B1* | 11/2018 | Griffin | H04L 63/0861 |
| 10,396,985 B1* | 8/2019 | Nagelberg | H04L 63/0861 |
| 2004/0128542 A1* | 7/2004 | Blakley, III | H04L 63/0281 726/12 |
| 2004/0185842 A1* | 9/2004 | Spaur | B60R 25/04 455/420 |
| 2005/0223413 A1* | 10/2005 | Duggan | G06F 21/6236 726/3 |
| 2006/0021018 A1* | 1/2006 | Hinton | H04L 63/06 726/10 |
| 2006/0129817 A1* | 6/2006 | Borneman | G06F 21/41 713/170 |
| 2006/0212520 A1* | 9/2006 | Logue | H04L 51/12 709/206 |
| 2006/0236382 A1* | 10/2006 | Hinton | G06F 21/41 726/8 |
| 2006/0248598 A1* | 11/2006 | Johnson | G06F 21/33 726/27 |
| 2006/0274695 A1* | 12/2006 | Krishnamurthi | H04L 63/0807 370/331 |
| 2007/0094400 A1* | 4/2007 | Childress | G06F 8/61 709/229 |
| 2007/0127495 A1* | 6/2007 | de Gregorio | H04L 63/0815 370/395.52 |
| 2008/0002696 A1* | 1/2008 | Claessens | H04L 63/102 370/392 |
| 2008/0010288 A1* | 1/2008 | Hinton | H04L 63/0815 |
| 2008/0010665 A1* | 1/2008 | Hinton | G06F 21/41 726/1 |
| 2008/0021997 A1* | 1/2008 | Hinton | H04L 63/0815 709/225 |
| 2008/0046984 A1* | 2/2008 | Bohmer | H04L 63/0853 726/5 |
| 2008/0091820 A1* | 4/2008 | Norman | G06Q 10/00 709/224 |
| 2009/0037736 A1* | 2/2009 | Djordjrvic | H04L 63/062 713/170 |
| 2009/0077251 A1* | 3/2009 | Brown | H04L 67/16 709/230 |
| 2009/0171969 A1* | 7/2009 | Ristock | G06Q 10/10 |
| 2009/0172025 A1* | 7/2009 | Ristock | G06Q 10/06311 |
| 2011/0035349 A1* | 2/2011 | Kretz | G06N 5/022 706/48 |
| 2011/0131643 A1* | 6/2011 | Lawrence | H04L 9/3213 726/10 |
| 2011/0145565 A1* | 6/2011 | Kol | H04L 63/0815 713/155 |
| 2011/0231450 A1* | 9/2011 | Sinha | G06F 16/256 707/802 |
| 2011/0265168 A1* | 10/2011 | Lucovsky | H04L 63/0245 726/7 |
| 2012/0084804 A1* | 4/2012 | Simmons | H04N 21/25816 725/28 |
| 2012/0110055 A1* | 5/2012 | Van Biljon | G06Q 30/04 709/201 |
| 2012/0216268 A1* | 8/2012 | Kassaei | H04L 63/20 726/9 |
| 2012/0291090 A1* | 11/2012 | Srinivasan | G06F 21/604 726/1 |
| 2012/0324233 A1* | 12/2012 | Nguyen | H04L 9/0866 713/179 |
| 2013/0047225 A1* | 2/2013 | Radhakrishnan | G06F 21/33 726/6 |
| 2013/0047242 A1* | 2/2013 | Radhakrishnan | H04L 63/0807 726/9 |
| 2013/0145419 A1* | 6/2013 | Hu | G06F 21/604 726/1 |
| 2013/0166703 A1* | 6/2013 | Hammer | H04L 41/50 709/220 |
| 2013/0198080 A1* | 8/2013 | Anderson | G06Q 20/3821 705/44 |
| 2013/0222523 A1* | 8/2013 | Shanmukhadas | H04N 5/85 348/14.08 |
| 2013/0227140 A1* | 8/2013 | Hinton | H04L 41/00 709/225 |
| 2013/0254102 A1* | 9/2013 | Royyuru | G06Q 20/382 705/39 |
| 2013/0298192 A1* | 11/2013 | Kumar | G06F 21/52 726/3 |
| 2014/0013452 A1* | 1/2014 | Aissi | G06F 21/604 726/30 |
| 2014/0020073 A1* | 1/2014 | Ronda | G06F 21/31 726/7 |
| 2014/0122731 A1* | 5/2014 | Burch | H04L 9/321 709/228 |
| 2014/0165134 A1* | 6/2014 | Goldschlag | G06F 21/60 726/1 |
| 2014/0337954 A1* | 11/2014 | Ahmed | H04L 63/0815 726/8 |
| 2014/0337955 A1* | 11/2014 | Mendelovich | H04L 63/0807 726/9 |
| 2014/0344153 A1* | 11/2014 | Raj | G06Q 20/3223 705/44 |
| 2015/0095367 A1* | 4/2015 | Mattsson | G06Q 20/385 707/769 |
| 2015/0100777 A1* | 4/2015 | Billings | H04L 63/0815 713/155 |
| 2015/0112870 A1* | 4/2015 | Nagasundaram | G06Q 20/3821 705/67 |
| 2015/0121448 A1* | 4/2015 | Burch | H04L 63/20 726/1 |
| 2015/0142673 A1* | 5/2015 | Nelsen | G06Q 20/385 705/76 |
| 2015/0213443 A1* | 7/2015 | Geffon | G06Q 20/3821 705/76 |
| 2015/0237041 A1* | 8/2015 | Flamini | H04L 63/0807 726/10 |
| 2015/0278500 A1* | 10/2015 | Burch | H04L 63/0281 726/6 |
| 2015/0288714 A1* | 10/2015 | Emigh | H04B 1/667 726/22 |
| 2015/0304318 A1* | 10/2015 | Delsuc | H04L 63/0815 726/7 |
| 2015/0381605 A1* | 12/2015 | Ko | H04L 9/3247 726/9 |
| 2016/0094543 A1* | 3/2016 | Innes | H04L 9/3263 726/6 |
| 2016/0094546 A1* | 3/2016 | Innes | H04L 63/0823 713/156 |
| 2016/0134616 A1* | 5/2016 | Koushik | H04L 63/08 726/9 |
| 2016/0142409 A1* | 5/2016 | Frei | H04L 63/0884 713/176 |
| 2016/0217459 A1* | 7/2016 | Lindner | G06Q 20/385 |
| 2016/0283740 A1* | 9/2016 | Roundtree | G06F 21/6245 |
| 2016/0307186 A1* | 10/2016 | Noe | G06Q 20/3278 |
| 2016/0330164 A1* | 11/2016 | Bellan | H04L 51/36 |
| 2017/0012965 A1* | 1/2017 | Hurst | H04L 63/0892 |
| 2017/0094123 A1* | 3/2017 | Ogawa | H04L 63/08 |
| 2017/0118201 A1* | 4/2017 | Hoyer | H04L 63/0815 |
| 2017/0223057 A1* | 8/2017 | Amiri | H04L 63/20 |
| 2017/0255932 A1* | 9/2017 | Aabye | G06Q 20/38215 |
| 2018/0007059 A1* | 1/2018 | Innes | H04L 63/107 |
| 2018/0041487 A1* | 2/2018 | Wang | H04L 63/0807 |

(56) References Cited

U.S. PATENT DOCUMENTS

| | | | |
|---|---|---|---|
| 2018/0084085 A1* | 3/2018 | Shanmugasundaram | ................... H04L 12/2818 |
| 2018/0108014 A1* | 4/2018 | Williams | ............. G06Q 20/409 |
| 2018/0115497 A1* | 4/2018 | Lin | ......................... H04L 47/70 |
| 2018/0139192 A1* | 5/2018 | Pishinov | ............. H04L 63/0815 |

FOREIGN PATENT DOCUMENTS

| | | | | |
|---|---|---|---|---|
| EP | 1895440 A1 * | 3/2008 | ............. | G06F 21/33 |
| WO | WO-2010030458 A2 * | 3/2010 | ........... | H04L 63/104 |

OTHER PUBLICATIONS

Coward, Greg, "Big-IP and ADFS Part 3—"ADFS, APM, and the Office 365 Thick Clients"", devcentral, May 16, 2012, 3 pages. (Year: 2012).*

Thia, Jean-Marie, "Using AD FS 2.0 for interoperable SAML 2.0-based federated Web Single Sign-On", Windows Server 2008 R2, Microsoft France, Jun. 2012, 36 pages. (Year: 2012).*

"Oracle Access Management Federation Service", Oracle white paper, Dec. 2013, 16 pages. (Year: 2013).*

Kemp Active Directory Federation Services (AD FS), version 1.0, Aug. 2013, 20 pages. (Year: 2013).*

Sandeep Chanda, "Microsoft Windows Identity Foundation Cookbook", Apr. 15, 2012, 294 pages. (Year: 2012).*

"Active Directory Federation Services (AD FS) Protocols Overview", Microsoft Corporation, Oct. 16, 2015, 31 pages. (Year: 2015).*

Nxumalo, Z. C., P. Tarwireyi, and M. O. Adigun. "Towards privacy with tokenization as a service." In 2014 IEEE 6th International Conference on Adaptive Science & Technology (ICAST), pp. 1-6. IEEE, 2014. (Year: 2014).*

Ahmad, Shafeeq, Shreya Paul, and Atma Prakash Singh. "Tokenization based service model for cloud computing environment." In 2016 International Conference on Inventive Computation Technologies (ICICT), vol. 3, pp. 1-7. IEEE, 2016. (Year: 2016).*

Jackson, Collin, and Helen J. Wang. "Subspace: secure cross-domain communication for web mashups." In Proceedings of the 16th international conference on World Wide Web, pp. 611-620. 2007. (Year: 2007).*

Hatakeyama, Makoto, and Shigeyoshi Shima. "Privilege federation between different user profiles for service federation." In Proceedings of the 4th ACM workshop on Digital identity management, pp. 41-50. 2008. (Year: 2008).*

Mazur, Pawel P. "Text segmentation in Polish." In 5th International Conference on Intelligent Systems Design and Applications (ISDA'05), pp. 43-48. IEEE, 2005. (Year: 2005).*

* cited by examiner

TOKENIZATION FEDERATION SERVICE

BACKGROUND

Tokens are often used to represent source data. For example, sensitive data such as social security numbers, primary account numbers, addresses, or the like are substituted with a token that a system uses as an alternative, thereby avoiding exposure of the sensitive data. Tokenization services transform the sensitive data elements into corresponding tokens and maintain mappings between the tokens and corresponding sensitive data elements.

Tokenization is typically done on a system-by-system or application-by-application or on a domain-by-domain basis where the tokens are particularly tailored to that system, application or domain. Such an architecture prevents distributed use cases (e.g., prevents sharing of the application-specific tokens across different systems, applications or domains).

Figure 1:
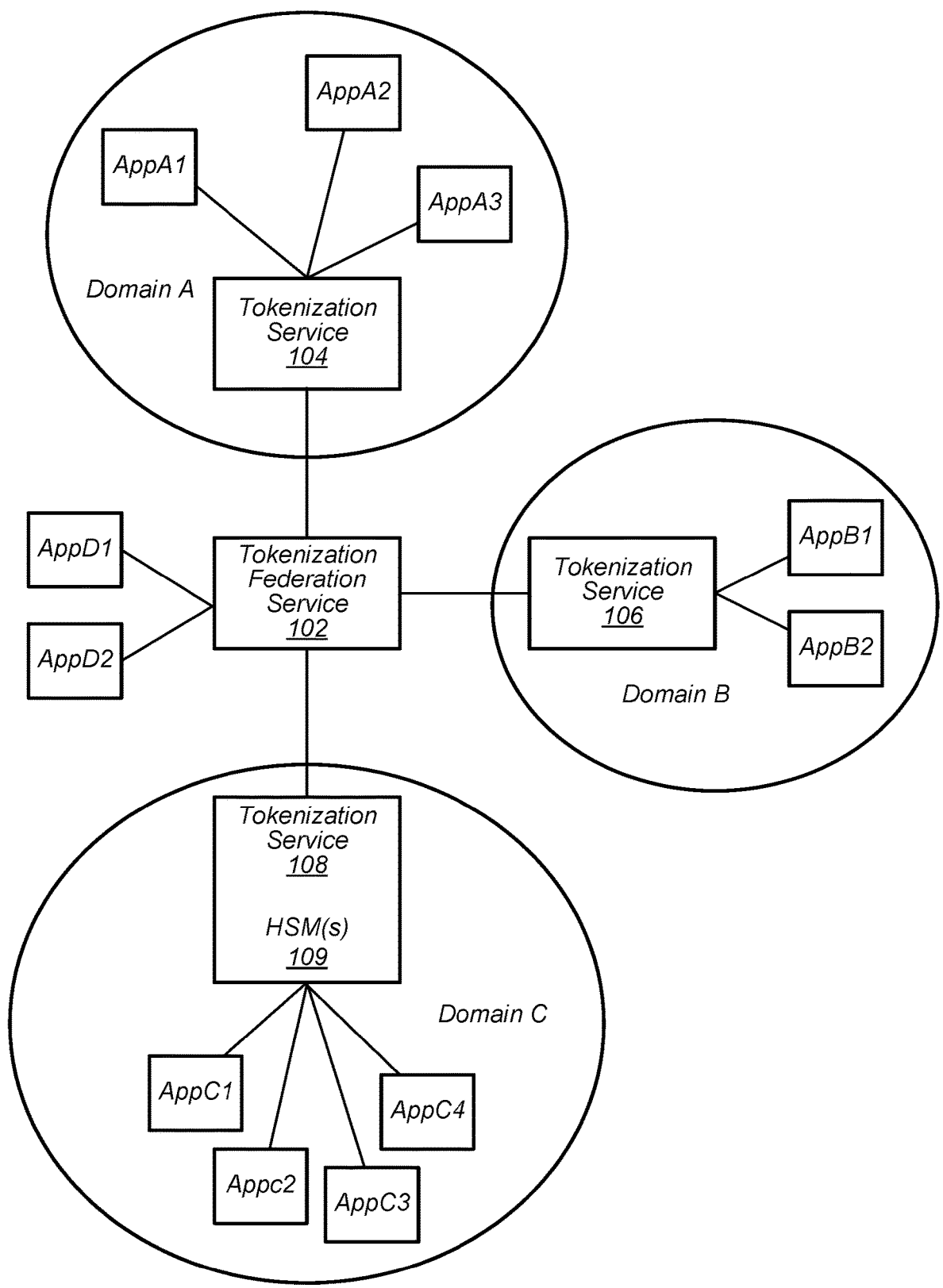
FIG. 1 depicts an example environment for a tokenization federation service among a number of different domains, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

In embodiments, a tokenization federation service is a central authority for establishing and verifying trust relationships between tokenization services in different domains. The tokenization federation service may also act as a centralized source for access to tokens and management of tokens and federations, in some embodiments. For example, the tokenization federation service may act as a source for generation and enforcement of rules for behavior and/or token formats among federated tokenization services.

The federation model creates a trust relationship between one or more originating tokenization services with one or more other tokenization services (e.g., extending to token users, in some embodiments) through the tokenization federation service, in some instances. The trust relationship may then be asserted along with the tokens being shared, generated, or revoked. In some instances, the trust relationship can be asserted along with a tokenization system component being federated, like a mapping/index or a vault that stores the mapping for example.

In some embodiments, the tokenization federation service acts as a mechanism for token portability between tokenization services. The token federation service may provide a number of different services, such as providing a proxy to hide the source of the originating tokenization service, providing a point of integration with other service provider services (e.g., identity access management, storage services, key management services, or workflow management, etc.). Other example benefits include a way to providing separate service control from token use policy (e.g., an identity and access management service may be used for control of access to the tokenization federation service, but separate token policies and assertions may be used to manage token use and workflow), a way to link tokens to systems that provide version control, tracking and reporting.

Generally, a token has no mathematical or cryptologic relationship that would allow the substituted data to be reverse engineered from the substitute. Whatever mechanism is used to match a token with the data that the token substitutes, the data cannot be reverse-engineered from the token. In some embodiments, the only way to get back to the data from the token is a lookup table. One benefit of such a scheme is that it allows use of the token in place of sensitive data such that the token can be treated as non-sensitive data, for example, thereby reducing the need for some security measures or controls in some systems because the system does not contain the sensitive data. Another benefit may be that the system can use the token in place of the sensitive data without risking exposure of the sensitive data. In some embodiments, the token may be configured such that the token behaves in a manner similar to the original data (e.g., the token is in the same format as the original data—such as in the form of a credit card number).

A non-limiting list of examples of source data that may be represented by tokens include social security numbers, tax information, credit reports, passport numbers, address information, primary account number, driver's license number, authentication credentials, etc. In one example, a system may receive a customer's credit card number and immediately perform a verification of the number to allow a transaction associated with an order to continue. The system may then exchange the credit card number for a token, store the mapping in secure storage, and pass the token along in multiple systems for further processing of the customer's order. In some environments, the processing of the customer's order may require the token to be passed along a number of different systems (e.g., legacy systems and new systems). Some of these systems may require that the token look and act like a credit card number. Thus, in some embodiments, the token may be generated such that the token appears and acts like a real credit card number. Such a format could be in accordance with rules for the token, established by a federation member in a policy, for example. Once the customer's order has been processed (e.g., once the token has been used in various different system workflows and system interactions) that actual credit card number can be used to bill for the customer order. This last step can be performed via an authorized request back to the tokenization service to exchange the token for the actual credit card number that can be passed out for payment. In some embodiments, the actual credit card number that is passed out may be required to be (e.g., required by the rules of a policy associated with the token) immediately dropped from memory once the payment has been made. Such a technique allows a system to hold (e.g., cache) sensitive data such as credit card numbers for a smaller period of time, thereby reducing the risk of exposure.

Token Caching

Tokens and/or the sensitive data associated with the tokens may be cached, either by the tokenization federation service, or by a local tokenization service that provides the token for local use but is not the originating tokenization service (e.g., the originating service may be the service that generated or requested generation of the token). Caching may be used to reduce the impact on system performance for tokens locations at a tokenization service distant from the token using entity, for example. In embodiments, rules regarding the caching (e.g., security measures required to cache a token, the maximum duration of time the token may be cached, what entity is authorized to cache the data, how often the cache must be updated or flushed to reduce risk of exposure of the sensitive data) may be included in the token rules (e.g., 808) or the access control policy (e.g., 806) illustrated in FIG. 8, described below.

Token Granularity

Tokens may be generated as token groups or token chains, in embodiments. Some tokens may be subdivided into subsets of information (e.g., a token may be a concatenation of smaller tokens), for example an address token may include separate fields that are each tokens for a mailing address (e.g., house number, street, city, state, zip code may each be individual tokens that are part of a larger mailing address token). While the same concatenated token may be passed among different systems, applications, domains or the like, the tokenization federation service provides the ability to control dereferencing of the smaller tokens on an individual basis. For example, the tokenization federation service may limit access for one application to the zip code of the token (e.g., to validate the tax due for a purchase), but allow another application full access to all of the fields of the token (e.g., to create a label for the shipment). In embodiments, the service may provide only the portion of the token that the requesting entity (e.g., a requestor) has been granted access. The tokenization federation service may provide a role-based access mechanism to control such types of access across a number of different applications, platforms, domains or the like.

FIG. 1 depicts an example environment for a tokenization federation service among a number of different domains, according to at least some embodiments. FIGS. 2-5 illustrate a number of features that may be performed by a tokenization federation service 102, in some embodiments (e.g., create a tokenization federation, manage membership for a federation, provide sensitive data to federation members, register tokens in a federation), while FIG. 6 illustrates a federated token determination process that may be performed by a tokenization service (e.g., tokenization services 104, 106, 108 as part of obtaining the sensitive data for a federated token). Without departing from the scope of the disclosure, the illustrated steps may be generally performed in different orders, and by different entities of the system, in embodiments.

FIG. 1 illustrates a number of tokenization services (104, 106, 108) that transform sensitive data elements into corresponding tokens and maintain mappings between the tokens and corresponding sensitive data elements. As illustrated, the different tokenization services (104, 106, 108) are associated with different respective applications in different respective domains (e.g., AppA1, AppA2, AppA3 are all part of Domain A, along with tokenization service 104 while AppB1 and App B2 are part of Domain B, along with tokenization service 106).

The tokenization services 104, 106, 108 are illustrated as connected to a tokenization federation service 102 via respective networks between the domains A, B, C and the tokenization federation service 102 (e.g., a public network such as the Internet, a private network such as an enterprise network, a service provider network, etc., or some combination thereof). Generally, the tokenization federation service 102 creates a mechanism for token portability between tokenization services. The tokenization federation service 102 may provide a mechanism to separate service control from token use policy (e.g., using an identity and access management system for control of the tokenization federation service) and separate token policy to manage token use and workflow.

AppD1 and AppD2 illustrate that applications may be configured to access the tokenization federation service 102 directly, without relying upon a tokenization service as an intermediary, for example. In some embodiments, applications may be configured to perform much of the functionality of a tokenization service. For example, applications may become members of a tokenization federation, create federations, and/or generate tokens for the federation.

In embodiments, an application (e.g., AppD1) may send a token it has received directly to the tokenization federation service 102 (e.g., without going through a tokenization service). If the tokenization federation service has the sensitive data cached it may respond with the sensitive data. Otherwise, the tokenization federation service 102 may obtain the sensitive data from the respective tokenization service for the token (e.g., tokenization service 108) and return the sensitive data directly to the application AppD1 (e.g., without going through a tokenization service between the application and the tokenization federation service). In some embodiments, the tokenization service may act similar to a proxy entity, for example, instead of returning the sensitive data to the application that provided the token (e.g., to AppD1), the tokenization federation service 102 may provide the sensitive data to another entity on behalf of the application. In some embodiments, such functionality may prevent the sensitive data from being exposed to the application that provided the token.

The domains may be linked with and communicate over any of various types of networks to the tokenization federation. In one example, the depicted domains A, B and C may represent various different domains of a single client within a cloud-based service provider. In another example, the domains A, B, and C may all represent geographically distinct domains, such as on premise domains for different enterprises that cooperate via the tokenization federation service to establish trust relationships (e.g., establish and manage federation memberships) between the tokenization services 104, 106, 108. Various other combinations of these and other domains are also contemplated.

HSM Example

In some embodiments, a client network (e.g., domain C) of a client system includes an on premise tokenization service (e.g., 108) built in part with hardware security modules 109 (e.g., to tokenize credit card numbers). The client's system may also include another tokenization service (e.g., tokenization service 106) that is operated on a service provider network (e.g., to provide tokenization of less sensitive address information), in embodiments. Thus, in some embodiments of the illustrated system, multiple tokenization systems are required to collaborate across boundaries to support multiple workloads that rely on credit card and mailing address tokens. The illustrated tokenization federation service 102 allows the distinct tokenization services to work together. For instance, the tokenization federation system may be configured to accept the credit card tokens and the mailing address tokens from the distinct tokenization services such that the tokenization federation service can create a third token representing both the credit card token and the mailing address token. The third token may be used by each of the client's various different applications, for example.

Generally, tokenization federation service 102 manages tokenization federations (e.g., creates federations and manages federation membership via membership policies), fields requests for the sensitive data for federated tokens, and federates tokens. In embodiments, the tokenization federation service 102 may enforce separation of duties and/or separation of access for the federated members. For instance, the tokenization federation service may restrict the customer's payment systems access to the third token to just the credit card number, or restrict the shipment label-making system's access to the third token to just the mailing address portion of the third token. In another example, the member that created the federation may be the only member allowed to alter the token format, while each member may be able to generate and/or delete their own tokens.

Role-Based Data Control

In some embodiments, the tokenization federation service may enforce rules that control access to the data. For instance, entities, such as tokenization services may make requests to access the data that a token substitutes. Rules, implemented by policies tied to the tokens determine access to that data. The enforcement of the rules may be tied to the authentication of the requesting entity tokenization service, in some instances. In some embodiments, the tokenization federation service may authenticate a requesting entity prior to processing a request for the underlying data. For example, the tokenization federation service may send the requesting entities credentials to an identity and access management system to be authenticated prior to processing the request. In some embodiments, the policy associated with the token may control which entities can access or control the data. For instance, the policy may indicate the federated parties for that particular data.

For example, for a collection of data, the system may enforce rules that match the granularity of the data. For instance, the system may implement policies that that are tied to the data and that determine the control of the data (e.g., what entities can access the data, which domains may use the data, when the data can be accessed, how much of the data can be accessed, who is the owner of the data, what entity can change, delete or expand the data, etc.).

For instance, in some embodiments, the control may be based on a primary/secondary scheme where a primary entity determines the rules of the policy associated with the data and the secondary entity either agrees to trust the primary entity and abide by the rules of the policy for that data or not. In another example, the system may be configured to provide multi-party authorization (e.g., requiring a quorum to set or change the policy, or to accept a trust relationship). Different levels of control may be associated with different types of authority, based on the sensitivity of the data, for instance. For example, a quorum may be required to expand the amount of data made available (e.g., expand the number of fields made available—release the entire credit card number, instead of just the last four digits) while a reduction in the amount of made available data (e.g., limiting the availability to just the last two digits) might be made based on something less than a quorum.

Authentication

It is contemplated that a tokenization federation service may provide its own authentication service, or may rely upon an external authorization service (e.g., an identity and access management service provided by a service provider that creates and manages users and groups, and uses permissions to allow and deny their access to resources).

In some embodiments, the system may be configured such that a tokenization federation service calls an identify and access management service to authenticate a requesting entity that made a request to the tokenization federation service in order to validate the roles and permissions of the requesting entity. In some embodiments, the requesting entity may have already been authenticated and the authorization passed to the tokenization federation service along with the request.

The system environment may be configured as a split role-based configuration, in embodiments. For instance, the tokenization service may rely upon the identity and access management service for configuration and operation of the tokenization federation service as a customer (e.g., how a customer is allowed to interact with the API of the tokenization federation service). Separately, the tokenization federation service itself may have primary control over the token-level permissions (e.g., set policy for how tokens can be used, under what circumstances, across which domains or systems). This is where the rules from the identity and access management authorization are applied to provide federated tokenization across multiple sources and multiple destinations, in embodiments.

For instance, some applications or domains may require a token to exhibit certain patterns and different systems may have different restrictions for the patterns. A tokenization federation service that orchestrates token sharing, generation, isolation, revocation, distribution, replication, access control and other aspects of the token lifecycle among numerous different applications or domains may provide numerous various options for how tokens are generated. In some instances, instead of applying a same well-defined algorithm to generate tokens (e.g., as in a system where one tokenization service provides tokens for one application or for one domain only), tokens may be generated in accordance with certain rulesets such that the tokens are suitable for use across numerous different applications, systems or domains that may each have their own distinct rules. In some instances, the tokenization services may register tokens with the tokenization federation service to facilitate interoperation of the tokens among various different and distinct domains.

Figure 2:
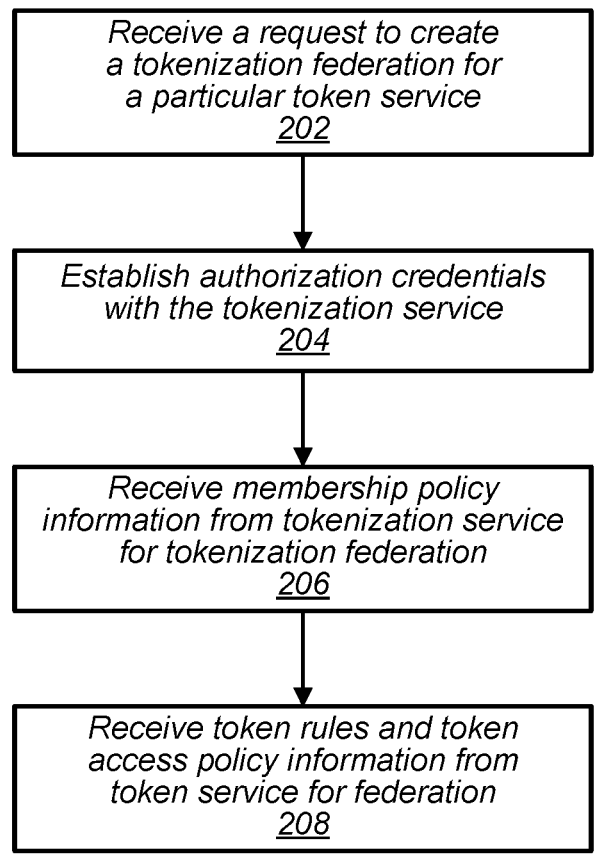
FIG. 2 is a process diagram that depicts a tokenization federation creation technique, according to at least some embodiments.

Tokenization federation service 102 may perform one or more of the steps illustrated in FIG. 2. FIG. 2 is a process diagram that depicts a tokenization federation creation technique, according to at least some embodiments. Generally, tokenization federation service 102 may manage federations among distinct tokenization services, such as performing lifecycle features of a federation of tokenization services. A non-exhaustive list of federation lifecycle features includes federation creation, federation membership changes, and federation dissolution, membership policy creation and management, etc. A tokenization federation service can be used as a proxy (e.g., to hide the source of the originating tokenization service) and/or cache of tokens to avoid stressing the originating tokenization service endpoints, in embodiments, and may also act as a disaster recovery solution.

Generally, to form a federation, a tokenization service (e.g., 104, 106, 108) makes a request to a tokenization federation service to create a tokenization federations. As illustrated at block 202, at request to create a tokenization federation for a particular token service is received (e.g., by the tokenization federation service 102). The tokenization federation service may authenticate the requesting tokenization service. For example, at block 204, authorization credentials are established with the tokenization service. For example, the tokenization federation service may make calls to an identity and authentication management system to perform the authentication, obtain the credentials from the tokenization service and send the credentials to an identity and authentication management system to be authenticated, or the tokenization federation service may perform the authentication directly. In embodiments, the tokenization federation service may be preconfigured with the authentication credentials of the requesting tokenization service (e.g., by an administrator).

Characteristics of the federation may be established at this point. For instance, at block 206, membership policy information is received from the tokenization service for tokenization federation. Membership in the federation may be pre-determined by the requesting tokenization service (e.g., the requesting tokenization service may provide the authentication credentials for the other members), or may be left open to requests from other services to join, and based upon some criteria in embodiments, such as a prospective member's agreement to the terms of the membership, or based upon a certification from a certificate authority. Membership may be limited in any of various ways, dependent upon domain, or some other form of authorization for instance. In some embodiments, the federation origination party (the party establishing the federation) may establish a membership policy that provides for joining members to accept other tokenization service provider's tokens and policies.

Characteristics of the tokens may be established at this point, for instance, at block 208, token rules and token access policy information is received from the tokenization service for federation. Token rules and token access may be policy-based. For instance, a token may be associated with a data type and that data type may be associated with a policy that specifies rules such as token format and/or access rules and the like across that particular type of object.

Figure 3:
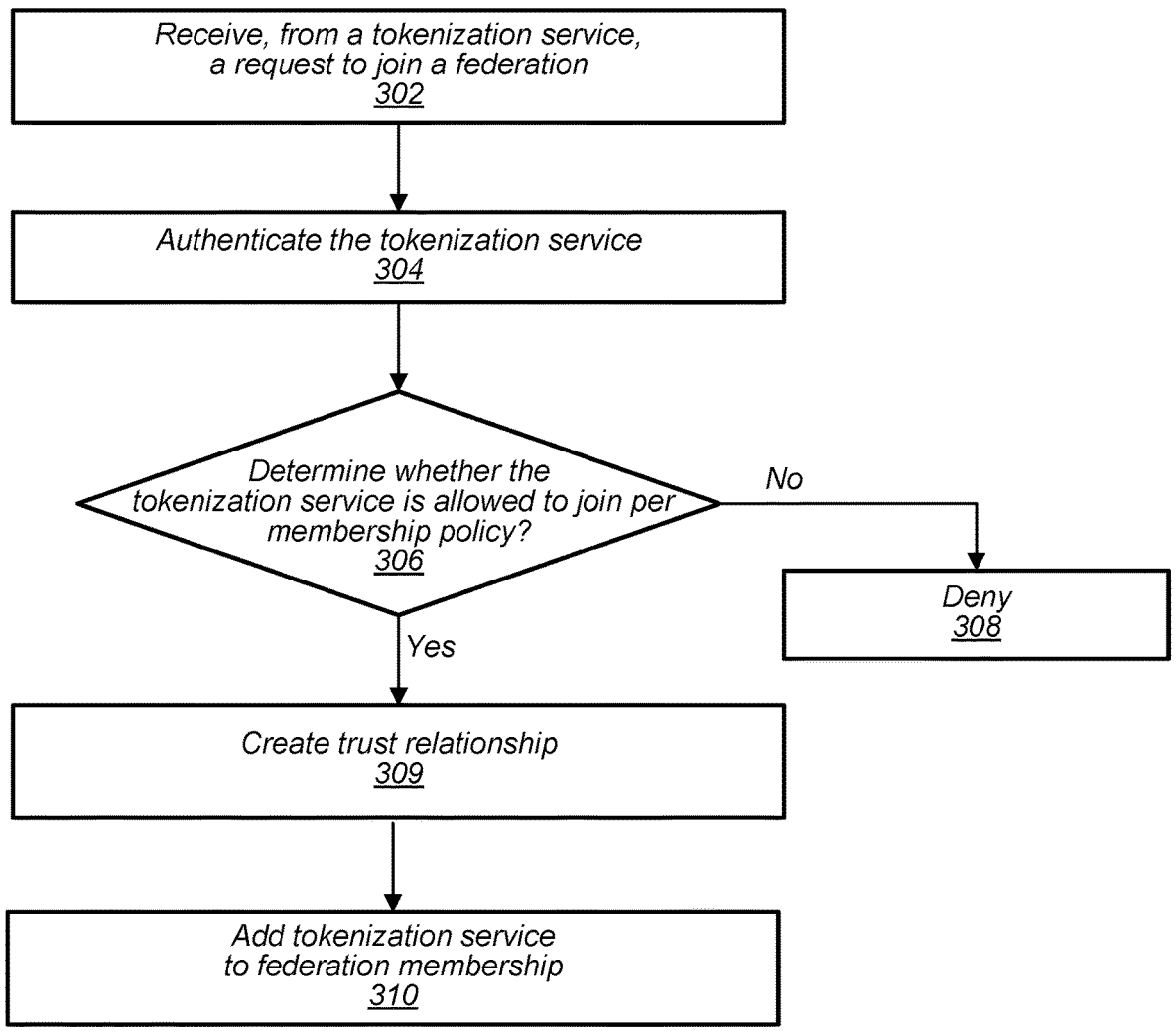
FIG. 3 is a process diagram that depicts a technique for a tokenization service to join an existing federation membership, according to at least some embodiments.

Once a tokenization federation is established as the tokenization federation service, members may join that particular group. FIG. 3 is a process diagram that depicts a technique for a tokenization service to join an existing federation membership, according to at least some embodiments. At block 302, a request to join a federation is received from a tokenization service (e.g., tokenization federation service 102 receives a request from tokenization service 106). At block 304, the tokenization service is authenticated. For instance, the tokenization federation service may compare credentials provided by the joining tokenization service to the credentials for the joining service that were provided by the tokenization service that established the federation group. In some embodiments, the tokenization federation service may rely upon an identity and access management service 706 to authenticate the joining tokenization service. At block 306, a determination is made whether the tokenization service is allowed to join per the membership policy. For instance, the membership policy information that was received at block 206 in FIG. 2 may be access from a policy stored by the tokenization federation service and used as a basis for determining whether the joining tokenization service should be allowed membership. Membership may be limited based on any number of criteria specified in the membership policy, such as whether the joining member provides a certificate from a certificate authority. In some embodiments, the tokenization federation service may pass the request on to an authorized member (e.g., the member that established the group or an administrator or otherwise) to determine whether membership is accepted. If not, the request is denied (block 308). If so, a trust relationship is created (block 309) and the tokenization service is added to the federation membership (block 310). For example, the joining tokenization service may be added to a list of members listed in the membership policy for that federation group.

In some embodiments, membership may be determined by determining whether the joining tokenization service agrees to the terms of the membership, specified in the membership policy. For instance, after authenticating the joining tokenization service, the tokenization federation service may present the terms of the membership policy to the joining tokenization service and request that the joining tokenization service agree to the terms of policy in order to be granted membership. Membership may be extended to include applications as members of the federation, in embodiments.

Figure 4:
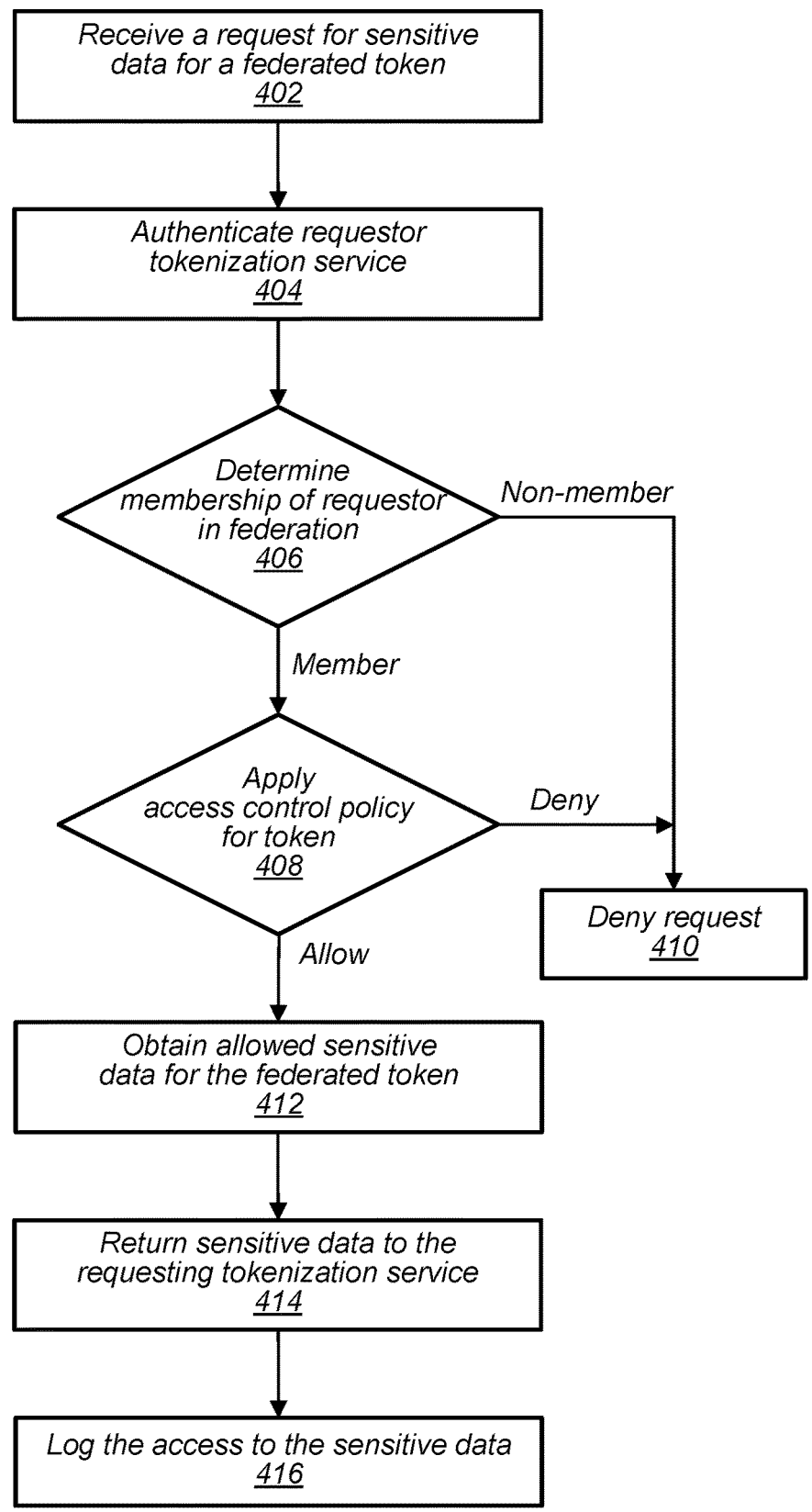
FIG. 4 is a process diagram that depicts a process for providing the sensitive data for a token to a tokenization service, according to at least some embodiments.

FIG. 4 is a process diagram that depicts a process for providing the sensitive data for a token to a tokenization service, according to at least some embodiments. A request for sensitive data for a federated token is received (block 402). For instance, using the environment in FIG. 1 as an example network, AppA1 in Domain A may be tasked with a process that involves processing an order using a credit card number. AppA1 may ask tokenization service 104 for the sensitive data associated with the token.

The local tokenization service 104 may determine that it does not have the sensitive data. For instance, the tokenization service 104 may determine (e.g., based on a field of the token or some other indicator—for instance some indicator generated during federation of the token—illustrated in FIG. 5, described below) that the token is a federated token. The local tokenization service 104 may then make a request to the tokenization federation service 102 for the sensitive data for the federated token. The requestor tokenization service is authenticated (block 404), by the tokenization federation service, for example, and a determination of membership of the requestor in the federation is made (block 406). For instance, the tokenization federation service 102 may determine whether the requesting tokenization service 104 is part of a membership list defined by a membership policy.

If the requesting tokenization service 104 is not a member, the request is denied (block 410) and if the requesting tokenization service 104 is a member, an access control policy for the token is applied (block 408). The access policy may grant or deny (block 410) access to the sensitive data for the requestor. For instance, the access policy may refuse access to any entity in the A domain, or may limit access to a particular one of the applications (e.g., AppA1, AppA2, or AppA3). In some embodiments, access may be limited to authorized users of the applications, in embodiments.

Sensitive data for a federated token that an entity is allowed to access is obtained (block 412). For instance, the tokenization federation service 102 may obtain the sensitive data from a local cache or the tokenization federation service may determine that the federated token is a registered token that is registered to another tokenization service (e.g., tokenization service 108) and request the sensitive data from a secure data store of the originating tokenization service 108.

Sensitive data for the federated token is returned to the requesting tokenization service. For example, whether the tokenization federation service 102 obtains the sensitive data from the cache or from the originating tokenization service 108, the sensitive data is returned to the requesting tokenization service 104. In some embodiments, the requesting tokenization service may provide the sensitive data to the application that requested it.

In at least the illustrated embodiments, the token access and/or configuration changes are logged. For instance, sensitive data accesses may be recorded and provided to clients in data logs, thus supporting version control, tracking and reporting functionalities. In various embodiments, the tokenization federation service 102 links the tokens to various services that provide for version control, tracking and reporting. In some embodiments, configuration changes (e.g., configuration changes to the tokenization federation service, to account membership, to access policies, to any of the other configurable parameters described herein, or the like) may be logged, via a logging service of a service provider or the like, for example.

Figure 5:
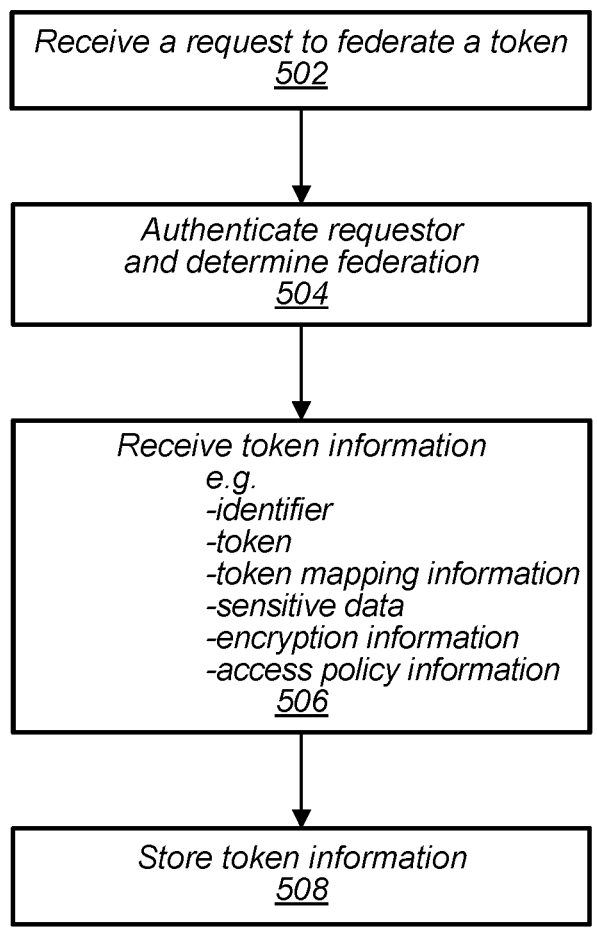
FIG. 5 is a process diagram that depicts a process for registration of a token with a federation, according to at least some embodiments.
Figure 6:
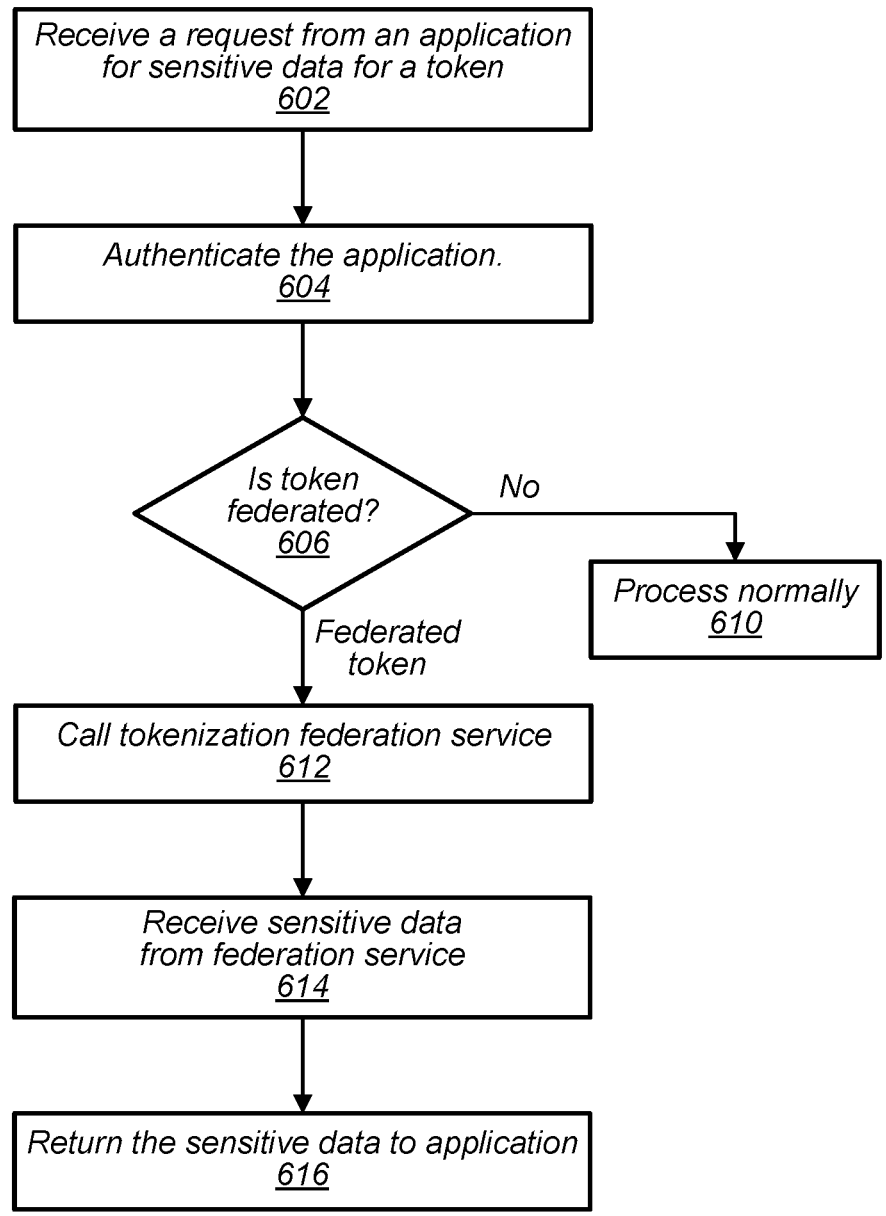
FIG. 6 illustrates process diagrams for determining whether a token is a federated token, in some embodiments.

FIG. 5 is a process diagram that depicts a process for registration of a token with a federation, according to at least some embodiments. A request to federate a token is received (block 502). For instance, a tokenization federation service 102 receives a request from a tokenization service 106 to federate a token. In some embodiments, the request may be to federate a token that the originating tokenization service generated. In some embodiments, the request may be a request for the token federation service 102 to generate and federate the token. The requestor is authenticated and federation of the requestor determined (block 504). For instance, the tokenization federation service may determine the group for which the requesting tokenization service is a member by considering a policy of a federation that lists the membership for that federation. In some embodiments, the request may include an indication of the intended federation group for the token.

At block 506, the token information is received. For example, the tokenization federation service 102 receives any combination of token information such as an identifier, the token itself, the federation for the token, permissions, ownership information, sensitivity level, token creation date, token metadata, mapping information that maps the token to the sensitive data for the token, the sensitive data itself, encryption information and/or access policy information. The token information is stored (block 508). For instance, the tokenization federation service stores the token information in any combination of various data stores, including a secure data store, as illustrated and described below in FIG. 7.

In some embodiments, the tokenization federation service may be configured to enforce rules of the federation. For instance, a token that is used as a substitute for credit card numbers may be required by the policy of the federation group to conform to a particular format. The tokenization federation service may enforce the format rule. For instance, the tokenization federation service may issue a notice of non-conformance to a tokenization service that produces a token that does not conform. In some embodiments, the tokenization federation service may provide an indication of validation of a token, such as that the token conforms to the rules of the federation, for example.

Other tokenization system components may be federated, in embodiments. For example, a mapping index (mapping the tokens to the sensitive data objects) or a token vault (containing the sensitive data and/or the tokens) may be federated.

FIG. 6 illustrates process diagrams for determining whether a token is a federated token, in some embodiments. The process may be performed by a tokenization service (e.g., tokenization service 104, 106, or 108). As illustrated, a request from an application for sensitive data for a token is received (block 602). For instance, using the services in FIG. 1 as an example, AppB1 in domain B makes a request to tokenization service 106 for the sensitive data for a token. The application is authenticated (block 604), and the tokenization service 106 determines whether the requested data is associated with a federated token (block 606). For example, the tokenization service 106 may recognize a field of the token indicating federation (e.g., a federation registration number), or the tokenization service may look up the token in a lookup table to determine that the token is federated. In some instances, the tokenization service 106 may assume any tokens that it does not recognize as a local token is a federated token. If the token is not a federated token, the token may be process normally (e.g., locally).

For a federated token, the local tokenization service 106 makes a call to the federated tokenization service 102 (block 612), and sensitive data is received from the federation service (block 614). For instance, the federation may provide the sensitive data from a local cache or may obtain the sensitive data from the originating tokenization service. The sensitive data is returned to the requesting application (block 616). For example, the tokenization service 106 returns the sensitive data obtained from the tokenization federation service 102 to the requesting application AppB1.

Figure 7:
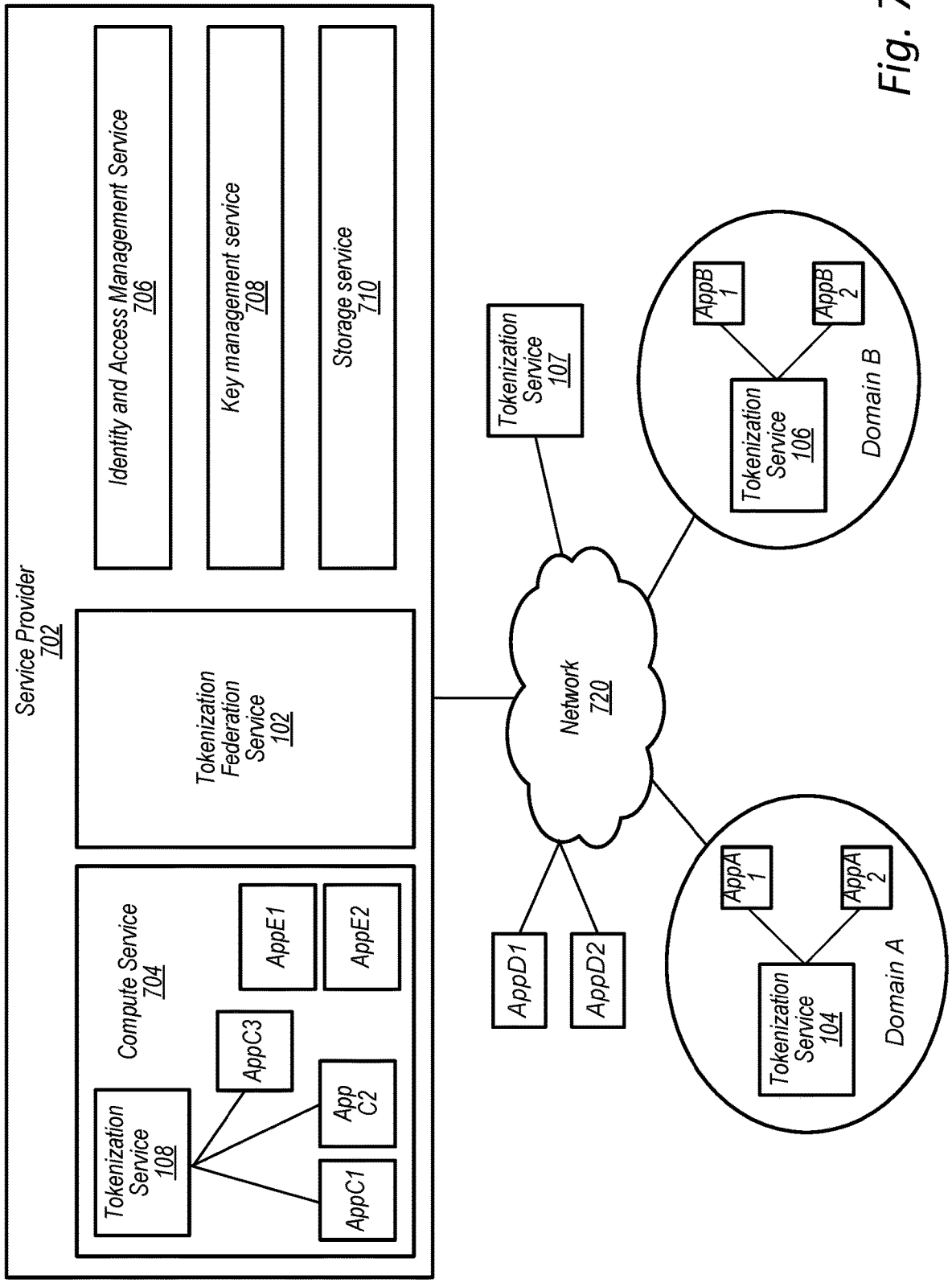
FIG. 7 illustrates a service provider environment that provides a tokenization federation service, according to at least some embodiments.

FIG. 7 illustrates a service provider environment that provides a tokenization federation service, according to at least some embodiments. The tokenization federation service may provide a point of integration with service provider or other services. In at least the illustrated embodiment, the service provider 702 is depicted as including a compute service 704, tokenization federation service 102, identity and access management service 706, key management service 708, and storage service 710. In some embodiments, the computer service 704 is a cloud-based scalable service that provides elastic compute capacity. The identity and access management service enables secure control access to service provider services and resources. The identity and access management service provides various functionality such as user and group account creation and management as well as permission controls. The key management service facilitates creation and control of encryption keys used to encrypt data and may use hardware security modules to protect the security of keys and may be integrated with other services of the service provider. For example, the key management service may be integrated with logging applications to provide logs of key usage and/or configuration changes. Storage service 710 may represent various types of cloud-based storage (e.g., secure, durable, database, and/or scalable storage). In some embodiments, the tokenization federation service 102 of the service provider 702 may include a token pattern generator that creates rulesets (e.g., rulesets on how federated tokens are to be redistributed).

In embodiments, the tokenization federation service 102 may integrate (e.g., via various APIs) with the various other services of the service provider (e.g., identity and access management service 706, key management service 708 and/or storage service 710).

An identity access management service (e.g., 706) may work in coordination with policies through the federation process. The policies may include rules that identify which entities have access not only to which data (e.g., who is authorized to exchange the token), but also to how much of which data (e.g., subsets of the data). For instance, one entity, authenticated by the identity access management system, may be provided access to an entire credit card number or social security number while another entity may be restricted to the last for digits.

In some instances, some clients may run various applications on the services provided by the service provider and may rely upon the tokenization service 102 to provide trust relationships between the service providers tokenization service 108 and the client's own tokenization services 106/108. For instance, a client may create federated tokens that are used by both applications (e.g., AppC1 and AppC2) and that rely upon the on premise tokenization service 104 of the client as well as the applications that run at the service provider (e.g., AppC3, AppC2, AppC1) and rely upon cloud-based tokenization service 108.

FIG. 7 illustrates that AppE1 and AppE2, implemented as part of compute service 704, are not necessarily associated with a tokenization service. AppE1 and AppE2 may send tokens directly to (and receive sensitive data directly from) tokenization federation service 102 (without going through a tokenization service as an intermediary). As described above, in some embodiments, applications may be configured to perform much of the functionality of a tokenization service. For example, applications may become members of a tokenization federation, create federations, and/or generate tokens for the federation.

Tokenization service 107 of FIG. 7 illustrates a third-party tokenization service (e.g., a tokenization service provided by another service provider, distinct from service provider 702).

The client's on premise applications and tokenization services may communicate with the service provider via network 720 (e.g., a public network such as the Internet, a private network such as an enterprise network, a service provider network, etc., or some combination thereof).

A tokenization federation service (e.g., 102) may exist in a number of different locations of various system architectures. For example, the tokenization service may be on premise and the tokenization federation service 102 could federate to service provider customers. In another example, the tokenization service is on premise and the tokenization federation service federates to clients in a different on premise location. In another embodiment, the tokenization federation service is based at a service provider 702 location and the tokenization federation service 102 would federate to on premise or third-party cloud providers. Any of these cases can be combined into other embodiments without departing from the scope of the disclosure.

Figure 8:
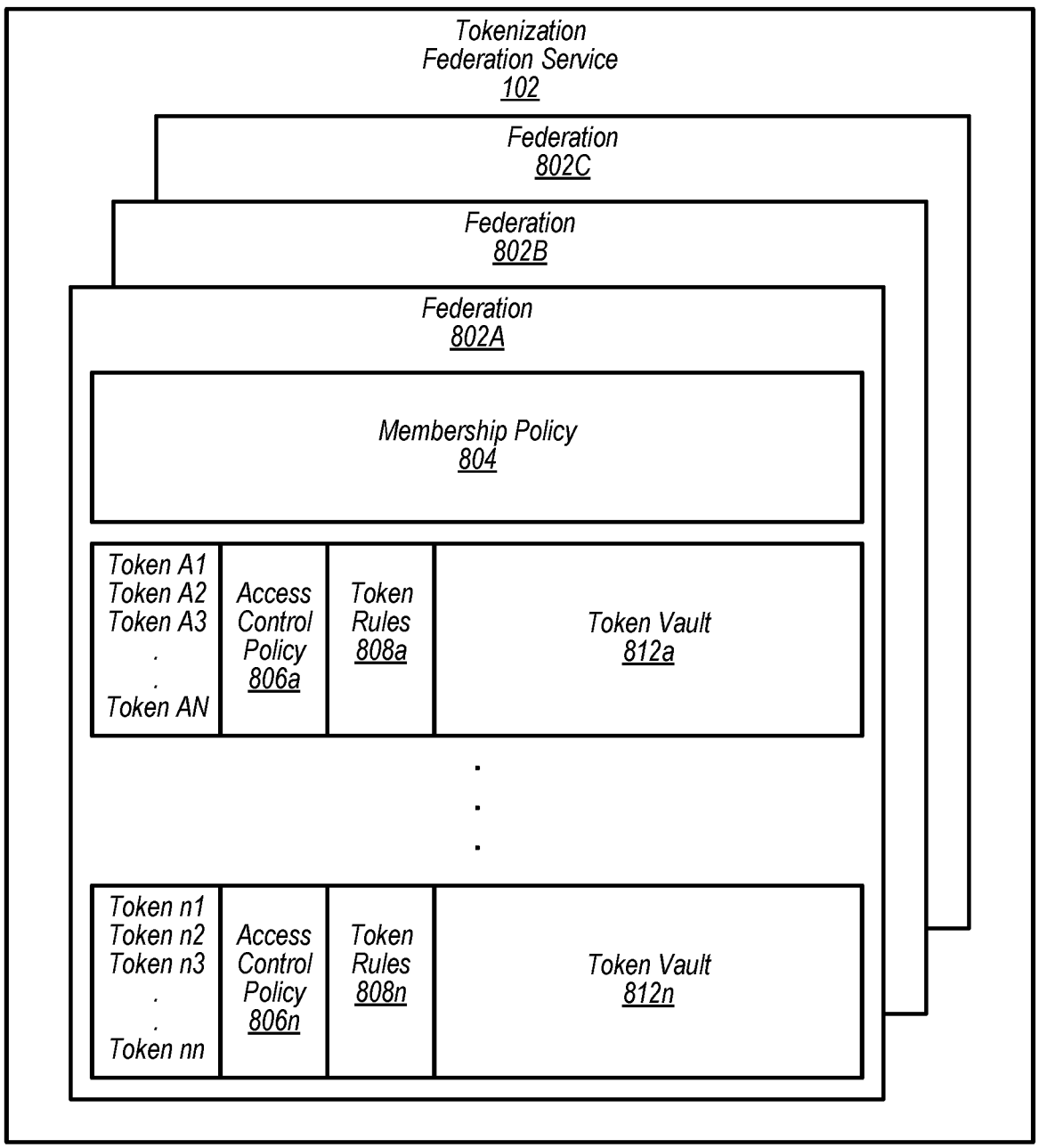
FIG. 8 illustrates a number of various federations of a tokenization federation service, according to at least some embodiments.

FIG. 8 illustrates a number of various federation groups of a tokenization federation service, according to at least some embodiments. Tokenization federation service 102 is illustrated as including information for a number of distinct federation groups (e.g., Federation 802A, 802B, 802C). In at least the depicted embodiment, each federation group includes a respective membership policy (e.g., 804), and rules and access controls pertaining to the tokens of that particular federation.

A membership policy (e.g., 804) sets rules and controls pertaining to the membership of the federation group. For instance, the membership policy may list the members of the federation group. The membership policy may include rules that determine how a customer may configure and operate the tokenization federation service. For instance, in some embodiments, the membership policy may determine how tokenization services are allowed to interact with an application program interface for the tokenization federation service. For instance, membership policies may include rules specifying which members can make changes to the policy (e.g., a quorum may be necessary to change security features associated with authenticating members—minimum characteristics of passwords, for example). Membership policies may indicate whether authentication is performed by the tokenization federation service or by some third party, such as an identity and access management service. Membership policies may be inherited by entities federating into the federation, in embodiments, A new policy may be generated by the entity establishing the trust relationship, in embodiments.

In some embodiments, the membership policies may be associated with any of a number of stages of policy lifecycle. For instance, membership policies may be changed, causing members to be added, removed (e.g., their credentials revoked) or membership rights may be altered (e.g., altering which member has the right to create a token, or altering which member can adjust the cache period for tokens of the federation, etc.).

Federation 802A is illustrated with tokens (A1, A2, A3, . . . , AN). Generally, a token has no mathematical or cryptologic relationship that would allow the substituted data to be reverse engineered from the substitute. Whatever mechanism is used to match a token with the data that the token substitutes, the data cannot be reverse-engineered from the token. In some embodiments, the only way to get back to the data from the token is a lookup table. In embodiments, tokens have metadata, such as an indication of ownership, a creation date, a sensitivity level, a unique identifier and a data type that allows policies to be applied across types of objects. The illustrated tokens are associated with an access control policy 806A that acts to set the permissions for those tokens. These token-level permissions can specify what entities (e.g., applications, or domains, or users, etc.) can use which tokens (e.g., tokens in federation group 802A, tokens specified in a list, or tokens of a certain datatype) and what domains the tokens may be used in (e.g., tokens that originated in domain A can only be used in domains A and B, not domain C). Generally, tokens may be shared, generated, revoked and the like. Token metadata may be used to determine a ruleset for distributing/consuming federated tokens. In some embodiments, token information, such as the token metadata may be requested and received by various entities, instead of the token.

Federation 802A is also depicted with token rules 808A. Token rules may specify characteristics associated with the particular tokens of the federation or of a particular subgroup of the tokens of the federation (e.g., tokens of a particular type). A non-exhaustive list of example rules includes token format, sub-dividability, whether the token is cacheable at the federation service or by another tokenization service, token sharing rules, token generation rules (e.g., who generates the token, how?), token revocation rules, etc.

A federation group (e.g., 802A) may include any number or groups of tokens that are controlled by a respective access control policy. For example, federation 802A is also depicted with tokens n1, n2, n3, nn, access control policy 806n, token rules 808n and token vault 812n.

The data associated with a federation may be stored in any of various locations. Once the trust relationship is established, the originating tokenization service could send a single token to the tokenization federation service, could send just the token metadata, a token mapping index (e.g., an index that maps tokens to sensitive data objects), the tokens encrypted source data, or the entire token vault (e.g., 812a) (e.g., a container including all the tokens for a federation or a sub group) to the tokenization federation service 102.

Originating tokenization data can be copied over to a tokenization federation service 102 for resilience, disaster recovery, continuity of operations use cases or synchronized and kept up to date. The originating tokenization service may send all elements of the tokenization backend to the tokenization federation service, in embodiments.

Various other embodiments are also contemplated without departing from the scope of this disclosure. In some embodiments, the tokenization federation service may be configured to generate tokens that cannot be exchanged. For instance, a tokenization service may generate an unexchangeable token and provide that token to a domain with a tokenization service. The rules of the federation for that token may require that an unexchangeable token cannot be exchanged among distinct domains or tokenization services. Such a rule may be enforced by the tokenization federation service, by refusing to allow or otherwise preventing another tokenization service to obtain the token, for example.

In some embodiments, the tokenization federation service may be configured to definitively expire and/or remove a token from the system, upon request from a tokenization service or application, for example. In some instances, expiring a token may include deleting or otherwise preventing access to a mapping between the token and sensitive data associated with the token.

In some embodiments, tokens of a federation may be associated with policies, grants, access control lists or the like that provide security features for the tokens. In at least some instances, additional authentication data may be provided along with a token to provide additional security to the token exchange. For instance, for an entity to obtain the sensitive data associated with a token from the tokenization federation service, the entity must provide the additional authentication data along with the token.

Illustrative System

Figure 9:
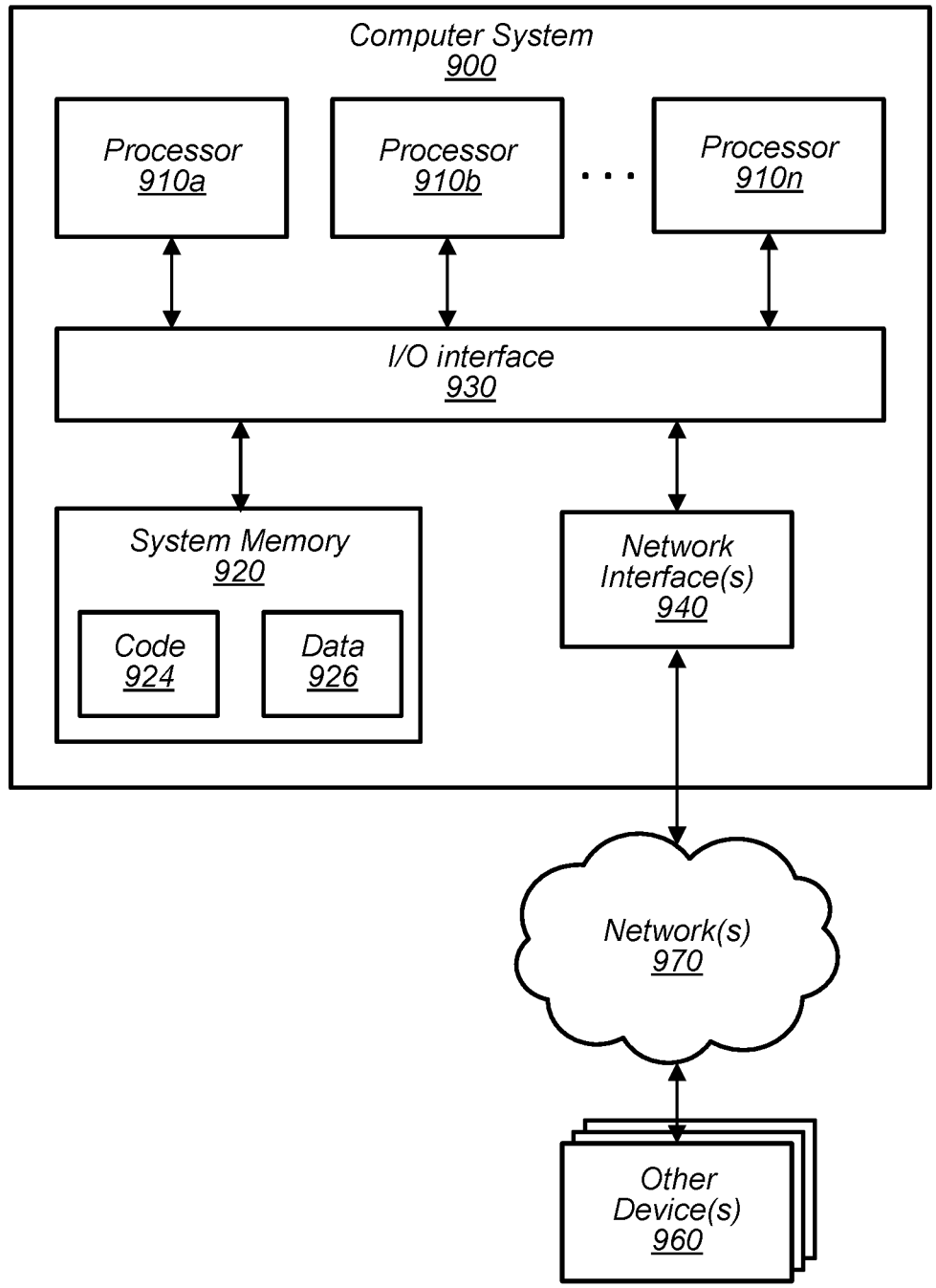
FIG. 9 is a block diagram illustrating an example computer system that may be used in some embodiments.

FIG. 9 is a block diagram illustrating an example computer system that may be used in some embodiments that implement tokenization services and/or a tokenization federation service. In at least some embodiments, one or more servers that implement a portion or all of the devices and processes that perform tokenization (e.g., 104, 106, 108) and/or tokenization federation (e.g., 102), as described herein. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for devices and processes that perform federated tokenization, are shown stored within system memory 920 as code 924 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950 (e.g., network 720 in FIG. 7), such as other computer systems or devices as illustrated in FIGS. 1, 7 and 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data to carry out the functionality as illustrated and described above for FIGS. 1-8 for implementing embodiments of devices and processes that perform federated tokenization. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
a plurality of computers configured to implement:
a plurality of tokenization services, wherein individual ones of the plurality of tokenization services are configured to:
provide tokens to substitute for data elements and maintain mappings between the tokens and the corresponding data elements, and
receive requests to exchange tokens for corresponding data elements according to the mappings, wherein different tokenization services are associated with different applications; and
a tokenization federation service for establishing trust relationships between tokenization services, wherein the tokenization federation service is distinct from the plurality of tokenization services, wherein to define trust relationships between tokenization services, the tokenization federation service is configured to:
receive, from a founding tokenization service, a request to establish a tokenization federation;
receive membership policy information that includes authorization credentials for the other ones of the tokenization services expected to join the tokenization federation being established;
receive token rules and token access policy information for the federation being established; and
store the membership policy information for the federation being established in a membership policy, and the token access policy information in a token access control policy; and
wherein the tokenization federation service is further configured to:
receive a request from a respective one of the tokenization services to join the tokenization federation;
determine that the respective tokenization service is permitted to join the tokenization federation according to the membership policy for the tokenization federation;
include the respective tokenization service in the tokenization federation;
receive over a network a request from a given one of the tokenization services to access at least a portion of data elements that were transformed into a federated token, the federated token originated by another one of the tokenization services distinct from the given tokenization service;
authenticate the given tokenization service as a member of the tokenization federation for the federated token; and
obtain the requested portion of the data elements corresponding to the federated token and return the portion of the data elements to the authenticated given tokenization service.

2. The system of claim 1, wherein the tokenization services are configured to transform data elements into corresponding tokens as substitutes and to replace the data elements with the substitutes such that the data element cannot be determined from the token via a mathematical or cryptologic relationship.

3. The system of claim 1, wherein, to determine that the authenticated given tokenization service is permitted to access the requested portion of the data elements, the tokenization federation service is further configured to:
obtain membership information from the membership policy for the tokenization federation; and
determine, based on the policy, that the given tokenization service is a member of the tokenization federation, wherein the access determination is based at least in part on the determined membership.

4. A computer-implemented method, comprising:
receiving, by a tokenization federation service, a request from a tokenization service to create a tokenization federation for the tokenization service, wherein the tokenization federation service is distinct from the tokenization service;
establishing, by the tokenization federation service, authorization credentials with the tokenization service;
receiving, by the tokenization federation service, membership policy information from the tokenization service for the tokenization federation;
receiving, by the tokenization federation service, token rules and token access policy information from the tokenization service for the tokenization federation;
receiving, by the tokenization federation service from a requestor tokenization service, requests to generate tokens for data elements for the created federation;
transforming data elements into corresponding tokens via substitution of the data elements with equivalents such that the data element cannot be determined from the token via a mathematical or cryptologic relationship;
providing the corresponding tokens to the requestor tokenization service; and
return, by the tokenization federation service, responsive to a request from a given tokenization service to access at least a portion of data for which a federated token was substituted, the federated token originated by another tokenization service distinct from the given tokenization service and distinct from the tokenization federation service, the portion of the data to the given tokenization service.

5. The computer implemented method of claim 4, further comprising:
receiving a request from the other tokenization service to join the tokenization federation;
determining that the other tokenization service is permitted to join the tokenization federation according to a membership policy for the tokenization federation;
storing membership information for the other tokenization service as a member in the tokenization federation.

6. The computer implemented method of claim 5, further comprising:
receiving a request from an additional tokenization service to join the tokenization federation;
determining that the additional tokenization service is not permitted to join the tokenization federation according to a membership policy for the tokenization federation;
denying the request for the additional tokenization service to join the tokenization federation.

7. The computer implemented method of claim 4, further comprising:
obtaining, by the tokenization federation service, credentials for one or more other tokenization services that are to be members of the created tokenization federation, obtaining comprising:
prompting the requesting tokenization service for authorizations for the one or more other tokenization services;
receiving the one or more authorizations from the requesting tokenization service; and
storing the one or more authorizations for the one or more other tokenization services that are to be members of the created tokenization federation, and an association between the one or more authorizations and the created tokenization federation.

8. The computer implemented method of claim 7, wherein the one or more received authorizations include authentication credentials for the one or more other tokenization services of the token federation, and wherein the associations are stored in a membership policy of the token federation.

9. The computer implemented method of claim 4, further comprising:
caching, by the tokenization federation service, token information for the corresponding tokens, wherein token rules associated with the cached corresponding tokens determine a maximum threshold period of time for caching the corresponding token information such that the cached corresponding token information is flushed from the cache after the maximum threshold period of time.

10. The computer implemented method of claim 4, further comprising:
receiving, from a requestor and by the tokenization federation service, a request to federate a token;
authenticating the requestor;
receiving, by the tokenization federation service, token information;
determining, by the tokenization federation service and based on the token information, the federation for the token; and
storing, by the tokenization federation service, the token information.

11. The computer implemented method of claim 4, further comprising:
receiving, by the tokenization federation service and from a requestor tokenization service, a request for a data for a federated token;
authenticating the requestor tokenization service;
determining that the requestor tokenization service is a member of the tokenization federation and that an access control policy of the tokenization federation indicates the requesting tokenization service has been granted access to the data for the federated token;
obtaining the allowed data for the federated token; and
returning the data to the requesting tokenization service; and
logging the access to the data.

12. A non-transitory computer readable storage medium storing program instructions for a tokenization federation service that, when executed by a computer, cause the computer to:
receive, from a remote requestor tokenization service, a request for a data element for which a federated token originated by another tokenization service of a federation of tokenization services was substituted, the originating tokenization service distinct from the requestor tokenization service and distinct from the tokenization federation service, wherein membership in the federation indicates a trust relationships between tokenization services of the federation;
determine membership of the requestor tokenization service for a federation of the federated token;
for a non-member, deny the request; and
for a member,
deny access for an access control policy that denies access by the requestor tokenization service; and
for an access control policy that allows the requestor tokenization service at least some access to the data element,
obtain, from a cache local to the computer, the allowed data element for which the federated token was substituted, and
return the allowed data element to the requestor tokenization service.

13. The non-transitory computer readable storage medium of claim 12, wherein the instructions cause the computer to:
receive, from the requestor tokenization service, requests to generate tokens for other data elements; and
generate tokens via substitution of the other data elements with equivalents, wherein the data elements for the generated tokens cannot be determined from the generated tokens via a mathematical or cryptologic relationship.

14. The non-transitory computer readable storage medium of claim 12, wherein to determine membership of the requestor tokenization service in the federation for the federated token, the instructions cause the computer to determine, based on a membership policy for the federation that the requestor tokenization service is a member of the federation for the federated token, wherein the membership policy indicates the membership of the federation.

15. The non-transitory computer readable storage medium of claim 12, wherein the instructions further cause the computer to log the access to and configuration changes within the federation in a logging data store.

16. The non-transitory computer readable storage medium of claim 12, wherein the instructions further cause the computer to, subsequent to obtaining the allowed data from the local cache, flush the cache storing the data based on a cache duration threshold obtained from an access control policy for the federation of the federated token.

* * * * *